(No Model.) 3 Sheets—Sheet 1.
A. HINMAN.
ELECTRIC MOTOR.

No. 520,782. Patented June 5, 1894.

WITNESSES:
L. D. Erion
C. M. Wilson

Alfred Hinman
INVENTOR

BY
ATTORNEY.

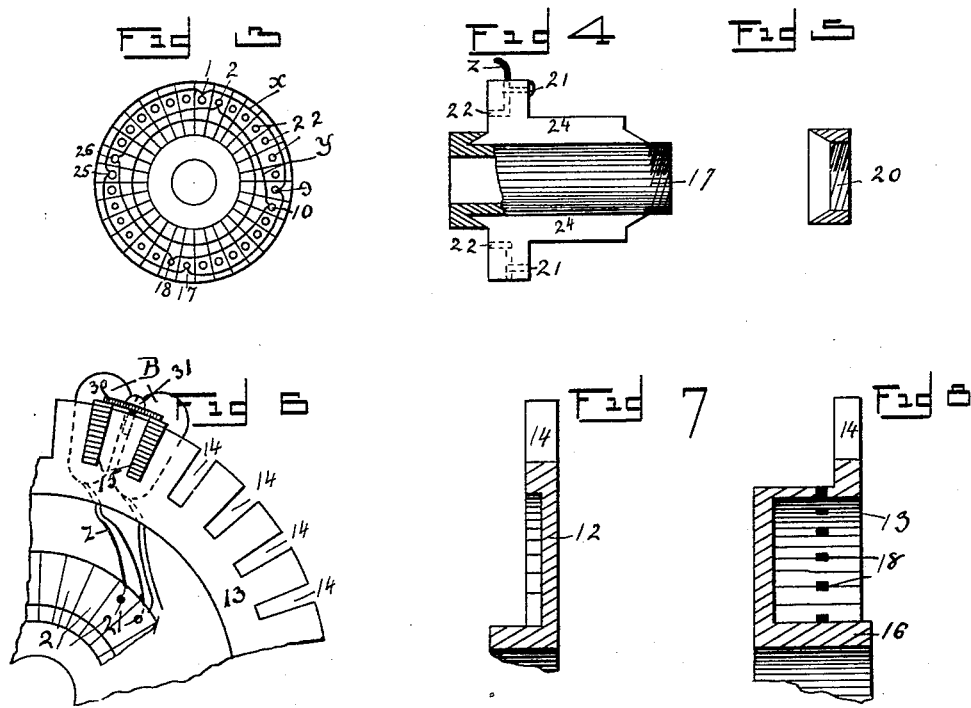

(No Model.) 3 Sheets—Sheet 3.

A. HINMAN.
ELECTRIC MOTOR.

No. 520,782. Patented June 5, 1894.

Witnesses
H. O. Pennock
L. S. Erion.

Alfred Hinman
Inventor

By Attorney

UNITED STATES PATENT OFFICE.

ALFRED HINMAN, OF OLYMPIA, WASHINGTON.

ELECTRIC MOTOR.

SPECIFICATION forming part of Letters Patent No. 520,782, dated June 5, 1894.

Application filed December 14, 1893. Serial No. 493,718. (No model.)

*To all whom it may concern:*

Be it known that I, ALFRED HINMAN, of Olympia, in the county of Thurston and State of Washington, have invented certain useful Improvements in Electric Motors; and I do hereby declare that the following is a full, clear, and exact description of the invention, such as will enable others skilled in the art to which it appertains to make and use the same, reference being had to the accompanying drawings, which form a part of this specification.

This invention has relation to a new and novel improvement in electric motors.

Figure 1:
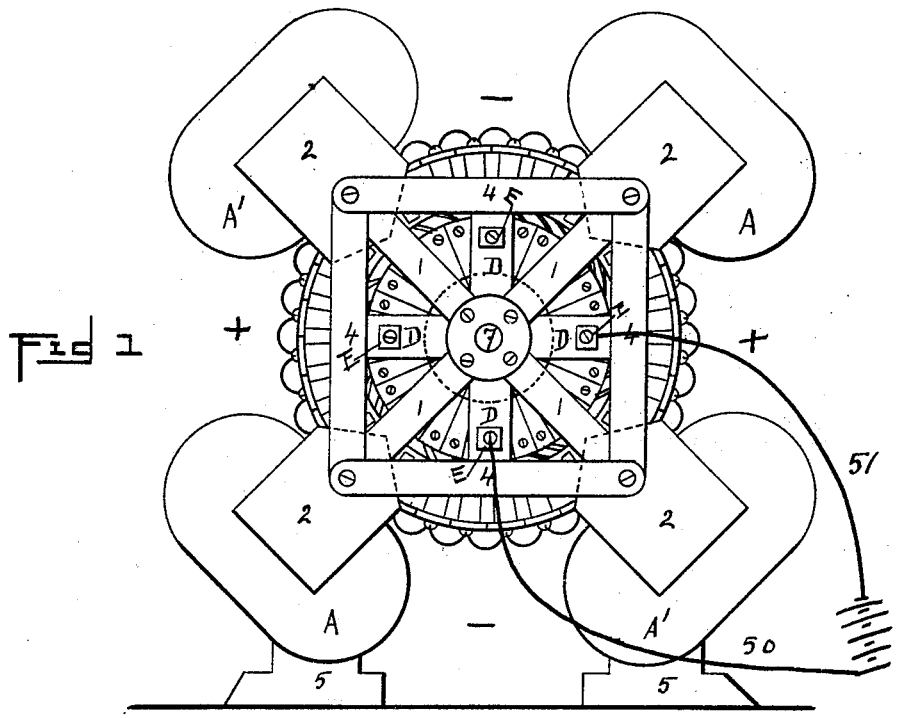
Figure 2:
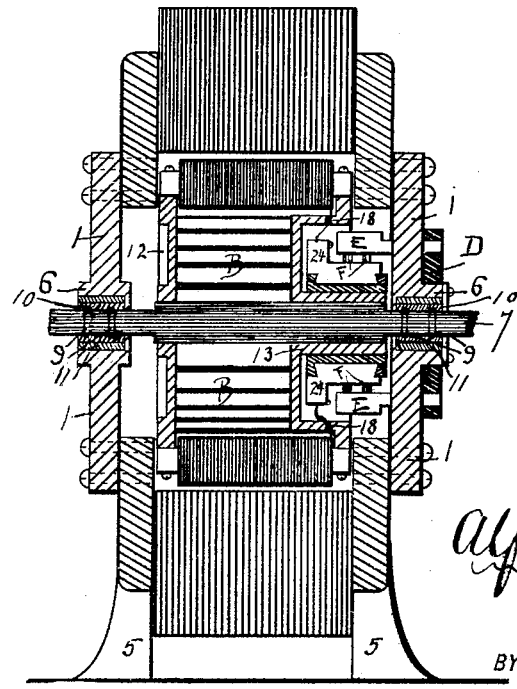
Figure 13:
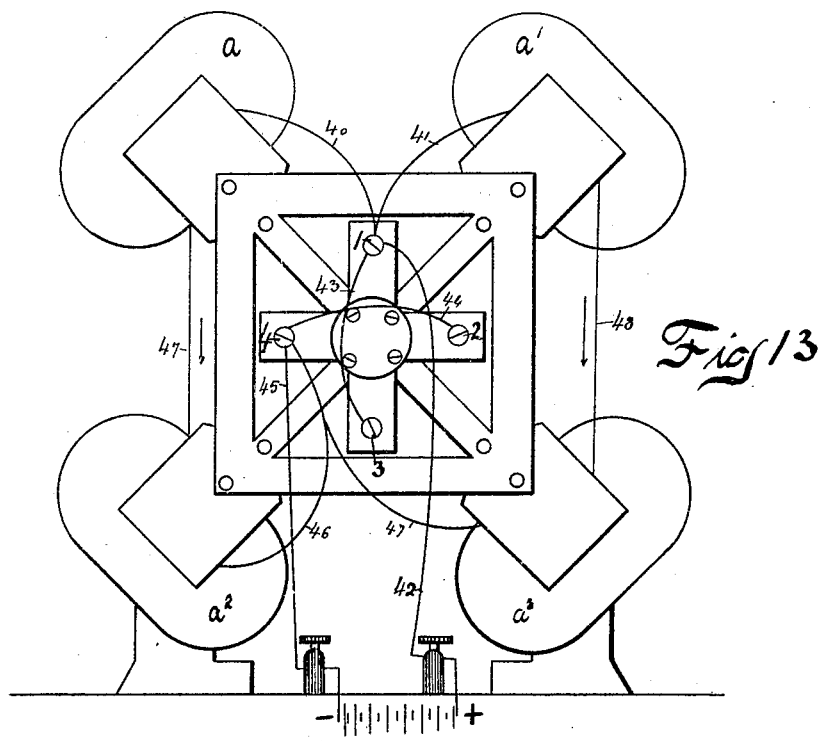
Figure 14:
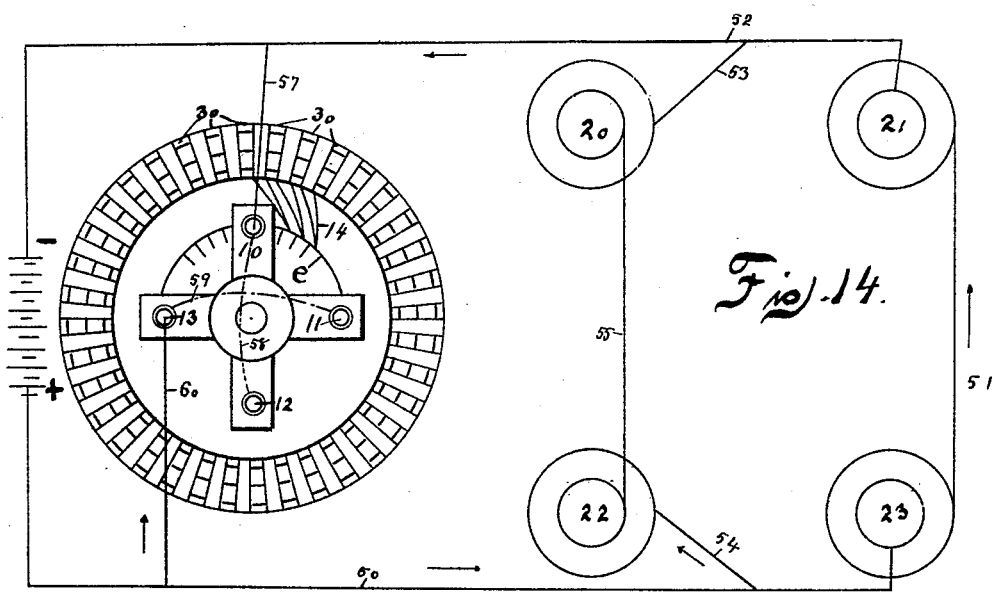

In the accompanying drawings, Figure 1 shows an end view of my improved motor. Fig. 2 shows a central sectional view thereof. Fig. 3 shows a rear end view of the commutator; Fig. 4 a broken side view thereof, while Fig. 5 shows the retaining nut. Fig. 6 shows a broken detached view of one of the face plates, showing the method of securing the armature coils. Figs. 7 and 8 are broken detached views of the plates holding these coils. Fig. 9 shows the side elevation and Fig. 10 the end view of one of these removable armature coils. Figs. 11 and 12 show a side and front view of one of the ends of the field magnets, while Figs. 13 and 14 show views illustrating the wire connections of the motor.

The motor comprises essentially a supporting frame marked 1, 1, which gives support to the four field magnets A, A, and A', A'. These magnets are used in sets of any even number and in the drawings, I have employed four. They are provided with the usual coils and are provided at the ends with the pole plates 2. These plates 2 are beveled and pointed below, as shown in Figs. 11 and 12, and provided with suitable screw openings 3, by means of which these plates are secured to the brace bars 4, 4. Two of the field magnets are provided below with a supporting standard 5, as shown. The braces 1, 1, have each a central hub 6, adapted to give a seating to the transverse shaft 7. This shaft 7 is preferably of two diameters and works within the hubs 6, 6. At the bearing point this shaft is provided with the collars 9 9, which work within the bearing 10, and so prevent this shaft from working laterally. The bearing 10 is in turn held within the two part supporting shell 11, which snugly fits within the opening within the hubs 6. Mounted upon the shaft 7 are the two supporting plates 12 and 13, which are secured to the shaft 7. These supporting plates are of course round and each is provided with a series of seatings 14, 14, within which the laminated coils 15 of the armature B are removably held. One of the plates 13 is dished so that the plate is provided with a hub 16, upon which the shouldered tube 17 is held. This disk 13 is further provided with a number of openings 18, as shown in Fig. 8. Mounted upon this tube 17, are the commutator segments 24, which are held thereon by means of the nut 20, which slides upon this tube. These commutator segments 24 are provided with the threaded openings 21 and 22, upon the front and rear adapted to receive the several connecting wires extending from the armature coils, and also those extending from one of the segments to the one ninety degrees distant. In Fig. 3, these holes 22 are shown as is also the method of connecting the segment to the wire X extending from the segments marked 1, to the segment marked 9.

In Fig. 6, I have shown a front end view of the disk 13, showing the arrangement of the connecting wire Z extending from the armature coil to the connecting screw in the threaded opening 21. The commutator is fixed to the hub 16 of the plate 13. The several segments of the commutator are positioned one-eighth to the right of the armature coil connected thereto, as will be understood by referring to Fig. 6. Each field acts independent of the rest and closes the poles through the armature. These fields are wound parallel, or in the same direction to the winding of the armature coils, and are placed so close to these armature coils that one field attracts a number of these armature coils. In my present invention, both the field magnets as well as the coils attract and repel the several armature coils in operating the motor. The several armature coils B are removably held within the seatings 14 14, of the plates 12 and 13, and are retained by means of the metallic washers 30, which work upon two of the cores 15, and are held in position by means of the set screw 31. The full set of armature coils is thus removably held within these seatings 14, 14. Now, should at any time any one of these coils become defective or unoperative, it would simply be necessary to loosen the screw and washer 31 and 30, when the defective coil can be readily removed and a sound one replaced, so that there would be no unnecessary loss of time. This is, of course, quite an advantage. These cores are wound by suitable wire, as is used in devices of this class.

The terminal plates 2, 2, of the several field magnets are further pointed below, so as to form the peak 41. From this peak these plates are beveled up to a certain point so as to centralize the force of attraction at these points.

D. D. represent the brush arms which are removably secured to the hub 6 of the forward plate. These arms D are preferably used in sets of four and are provided with suitable openings, within which the holders E are held. These holders E are preferably of metal and are insulated by the arms D, and provided with two or more carbon brushes, which are removably held within these holders 18. Working within these holders E are the small coil springs which press against the brushes F, and so continue to force them upon the commutator segments 24. By the employment of the four brushes, the current is sent around the armature in half multiple. The connection should be made as follows: The wire 50 leading from the battery should be connected to one of the brushes E and extend from there to the brush opposite; while the wire 51 would extend to the brush E' and extend to the brush opposite thereto. The field coils are connected in series and they are then connected in multiple with the armature.

In their operation, the field magnets each operate independently and are arranged so that the current in passing through the field magnets would make the magnets A, A, and A', A', of opposite polarity, as shown by the plus and minus symbols in Fig. 1. The armature coils are connected inside wire to outside wire at the commutator segments thereby making them the same polarity at one end of the armature and opposite polarity at the other end, but there being a wire running from each segment to the segment one-fourth the distance around, produces opposite polarity in the armature to the fields, toward which each coil is advancing.

In Figs. 13 and 14 I have shown the wire connections.

In Fig. 13 the plus sign represents the initial or starting point of the current as it leaves the battery and passes through a suitable binding post, and being conducted through the wire, 42, to the brush 1. At this brush the current is divided, part of it being directed to the fields and a part to the armature. The current going to the fields is again sub-divided, being conducted over the wires, 40, to the field, $a$, and then by the wire, 47, to the field, $a^2$, and from thence through the wire 46, to the brush marked 4. The remaining division of the current leaving the brush 1 being directed over the wire, 41, to the field, $a'$, through the wire, 48, to the field, $a^3$, and thence by means of the conductor, 47, through the wire 46, and terminating at the brush, 4. From the brush, 4, the current is directed over the conductor, 45, to the negative pole of the battery, as shown in the figure. That portion of the current being divided at brush 1, and going to the armature is directed over the conductor, 43, to the brush marked 3. It is of course understood that the current being directed from the brush, 1, to the armature, which is not shown in this figure, goes partly through armature to the brush, 2, and partly through the armature to the brush, 4. So, also, the current which has been directed to the brush, 3, over the conductor, 43, is directed partly over the armature to the brush, 2, and similarly upon the other side being directed to the brush marked 4. The brushes, 2 and 4, are further connected by means of the conductor, 44. It will be seen by the diagram that the armature connects with the fields and brush No. 4 and forms the main line to the battery.

In Fig. 14 the electric connections are again shown in their connection with the armature. The current emanating from the battery at the point marked by the plus sign passes up the conductor, 50, dividing, part passing up the conductor, 60, to the brush, 13, the remaining part being conducted up the conductor, 50, to the point, 54, where it is divided, part being directed to the field of the magnet, 22. From the magnet, 22, the current is again conducted by means of the wire, 55, to the magnet, 20, from the field of which it is conducted by means of a conductor, 53, to the line, 52. The remaining portion of the current being divided at 54 is directed to the magnet, 23, and from the field of this magnet through the conductor, 51, to the field of the magnet, 21, from the core of which it is directed to meet the conductor, 53, and from thence passing to the conductor, 57, where the current is united, the connection, 52, being continued to the negative pole of the battery. From the brush, 13, which, of course, is in contact with the commutator, $e$, the current is divided, a part being directed over the conductor, 59, to the brush, 11, the remaining portion of the current being directed into the commutator. That portion of the current going into the armature through the brush, 13, divides, part of it going through the armature to the brush No. 10, and part of it going in the reverse direction through the armature to the brush No. 12; and that part of the current going into the armature at brush, 11, also divides, part of it returning through the armature to the brush No. 10, and the other part in the reverse direction through the armature to the brush numbered 12.

14 represents the connections of the coils of the armature to the commutator. As the current leaves the brushes, 12 and 10, it passes up through the conductor, 57, and connects with the conductor, 52, to the battery. The cores of the armature magnets are represented by the figure 30, as shown in their connection with the commutator, e. The current going into the armature in each half in opposite directions produces opposite polarity in each section or quarter of the armature, corresponding to the polarity of fields. Each quarter or section is kept the same polarity of the field from which it is leaving and opposite polarity to the field toward which it is advancing.

Now, having thus described my said invention and the best method known to me for operating the same, what I claim as new, and desire to secure by United States Letters Patent, is—

1. In an electric motor, the combination with a supporting frame; of two or more field magnets within said frame; the projecting ends of each of said field magnets being beveled and pointed; a supporting shaft mounted within said standards and provided with two supporting disks, said disks having radial seatings adapted to removably hold a series of armature coils, one of said disks being dished, so as to provide a supporting sleeve; a commutator fixed to said sleeve; brush holders, suitably supported and protected above said commutator and provided with spring actuated carbon brushes and a series of armature coils removably held within the seatings of said supporting disks, all in proper electric connection and arranged substantially as and for the purpose set forth.

2. An electric motor in combination with a suitable supporting standard; of two or more electro magnets, said magnets being provided at the end with inwardly extending cores, said cores being pointed and beveled at the edge and secured to a suitable supporting frame; a shaft supported within said standard and provided with the disks 12 and 13, said disks being provided with the radial seatings 14, adapted to removably hold the series of armature coils B, said armature coils in operating being attracted and repelled by the field magnets, as well as the coils of the fields. A commutator mounted upon the hub 16, of the dished disk 13, provided with the openings 18, the movable supports D adapted to support the brush holders E, said holders E being provided with spring actuating carbon brushes, all arranged substantially as and for the purpose set forth.

3. In an electric motor, the combination with a supporting frame 1 and 4, and standard 5, of the field magnets A. A. and A' A', provided with the projecting cores, the cores being pointed and beveled so as to centralize the attraction of the poles; the shaft 7, provided with the disks 12 and 13, provided with the radial seatings 4, adapted to removably hold the series of armature coils B; the disk 13 being provided with the hub 16, giving a support to a suitable commutator, the movable supports D, the holding brush supports E, in combination with the spring actuated brush F, all in proper electric connection, substantially as and for the purpose set forth.

In testimony whereof I affix my signature in presence of two witnesses.

ALFRED HINMAN.

Witnesses:
G. W. SUES,
C. W. ANDERSON.